(12) United States Patent
Yamamoto et al.

(10) Patent No.: US 12,275,377 B2
(45) Date of Patent: Apr. 15, 2025

(54) DEFOGGING DEVICE

(71) Applicant: TOYOTA JIDOSHA KABUSHIKI KAISHA, Toyota (JP)

(72) Inventors: Yuki Yamamoto, Toyota (JP); Takahiro Miyadoh, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 746 days.

(21) Appl. No.: 17/470,656

(22) Filed: Sep. 9, 2021

(65) Prior Publication Data

US 2022/0185236 A1 Jun. 16, 2022

(30) Foreign Application Priority Data

Dec. 10, 2020 (JP) ................... 2020-204975

(51) Int. Cl.
*B60S 1/02* (2006.01)
*H05B 3/56* (2006.01)
*H05B 3/84* (2006.01)

(52) U.S. Cl.
CPC ............. *B60S 1/026* (2013.01); *H05B 3/56* (2013.01); *H05B 3/84* (2013.01)

(58) Field of Classification Search
CPC ... B60S 1/026; B60S 1/02; H05B 3/56; H05B 3/84
See application file for complete search history.

(56) References Cited

U.S. PATENT DOCUMENTS

| 2022/0338310 A1* | 10/2022 | Yano | B32B 17/10348 |
| 2023/0093219 A1* | 3/2023 | Ichida | B60R 1/001 |
| | | | 219/203 |

FOREIGN PATENT DOCUMENTS

| JP | 2017114484 A | * | 6/2017 | |
| JP | 2017-168310 A | | 9/2017 | |
| JP | 2017216193 A | * | 12/2017 | ............... H05B 3/86 |
| JP | 2020-147050 A | | 9/2020 | |
| JP | 6787776 B2 | * | 11/2020 | |
| WO | 2018055390 A1 | | 3/2018 | |

\* cited by examiner

*Primary Examiner* — Dana Ross
*Assistant Examiner* — Adam M Eckardt
(74) *Attorney, Agent, or Firm* — Dinsmore & Shohl LLP (57) ABSTRACT

A defogging device includes a heating wire configured to heat a windshield. The heating wire includes a plurality of parallel arrangement portions generally parallel to each other and provided such that respective intermediate parts, in the longitudinal direction, of the parallel arrangement portions are placed inside a field angle region. The parallel arrangement portions include two adjacent parallel arrangement portions provided such that respective first ends, in the longitudinal direction, of the two adjacent parallel arrangement portions are connected to each other via a connecting portion outside the field angle region, and respective second ends of the two adjacent parallel arrangement portions are separated from each other without being connected to each other. The second ends of the two adjacent parallel arrangement portions are connected to heat-amount supplement portions provided outside the field angle region and projecting toward their respective counterparts out of the two adjacent parallel arrangement portions.

3 Claims, 4 Drawing Sheets

DEFOGGING DEVICE

CROSS-REFERENCE TO RELATED APPLICATION

This application claims priority to Japanese Patent Application No. 2020-204975 filed on Dec. 10, 2020, incorporated herein by reference in its entirety.

BACKGROUND

1. Technical Field

The present disclosure relates to a defogging device including a heating wire provided on a windshield of a vehicle.

2. Description of Related Art

In the related art, there has been known a defogging device for a vehicle, the defogging device being configured to defog a windshield by heating the windshield by a heating wire. Japanese Unexamined Patent Application Publication No. 2020-147050 (JP 2020-147050 A) describes a defogging device configured such that a heating wire including a plurality of linear parts parallel to each other is provided in a field angle region of a camera as a sensor device. With such a defogging device, light receiving can be performed accurately by defogging the field angle region of the camera.

In the meantime, in a case where the windshield locally has a low-temperature part when the windshield is heated by the heating wire, it might be difficult to prevent fogging of the low-temperature part and to remove the fogging. Accordingly, in such a case, the quality of an image captured by the camera might decrease. When intervals between the parts of the heating wire that are parallel to each other are decreased so that a low-temperature part is not caused locally within the field angle region of the camera, the number of heating wires appearing on the image captured by the camera increases. This largely affects the quality of the image (that is, the quality of the image might decrease). Further, in order to prevent short circuit between the heating wires, it may not be desirable that the heating wires be disposed too close to each other.

SUMMARY

The present disclosure has been accomplished in order to solve the above problems. That is, one object of the present disclosure is to provide a defogging device that can prevent or restrain a low-temperature part from being locally caused within a field angle region of a sensor device without decreasing intervals between heating wires present in the field angle region of the sensor device.

A defogging device according to the present disclosure is a defogging device for defogging a windshield placed on a side of a sensor device on which an electromagnetic wave is incident from outside a vehicle. The sensor device is configured to acquire information outside the vehicle by detecting the electromagnetic wave. The defogging device includes a heating wire disposed on the windshield. The heating wire is configured to heat the windshield by generating heat by current application. The heating wire includes a plurality of parallel arrangement portions generally parallel to each other and provided such that respective intermediate parts of the parallel arrangement portions in the longitudinal direction of the parallel arrangement portions are placed inside a field angle region that is a region where the sensor device detects the electromagnetic wave. The parallel arrangement portions include two adjacent parallel arrangement portions provided such that respective first ends, in the longitudinal direction, of the two adjacent parallel arrangement portions are connected to each other via a connecting portion outside the field angle region, and respective second ends, in the longitudinal direction, of the two adjacent parallel arrangement portions are separated from each other without being connected to each other, the second ends being provided on an opposite side to the first ends. The second end of at least one of the two adjacent parallel arrangement portions is connected to a projecting portion placed outside the field angle region and projecting toward the other one of the two adjacent parallel arrangement portions.

A region near end parts of the two adjacent parallel arrangement portions, the end parts being connected to each other via the connecting portion, is heated by heat generated from the two adjacent parallel arrangement portions and the connecting portion. In the meantime, a region near end parts of the two adjacent parallel arrangement portions, the end parts being not connected to each other via the connecting portion, is heated by heat generated from the two adjacent parallel arrangement portions and the projecting portion. Accordingly, it is possible to prevent or restrain the temperature of the region near the end parts not connected via the connecting portion from being lower than the temperature of the region near the end parts connected via the connecting portion.

In one aspect of the present disclosure, the projecting portion may include a bending portion bending at an acute angle, the bending portion being placed between the two adjacent parallel arrangement portions and between respective extension lines of the two adjacent parallel arrangement portions, the bending portion being provided in a connecting portion between an adjoining portion extending generally in parallel to an edge of the field angle region outside the field angle region and a part of the projecting portion, the part extending from the adjoining portion such that the part is separated from the field angle region.

The amount of heat to be supplied to the windshield from the bending portion bent at an acute angle is larger than the amount of heat to be supplied from other parts. Accordingly, the provision of the bending portion can enhance an effect of preventing or restraining the temperature of the region near the end parts not connected via the connecting portion from being lower than the temperature of the region near the end parts connected via the connecting portion.

In one aspect of the present disclosure, the heating wire may further include a field angle outside wiring portion provided outside the field angle region and connected to an electrode such that the field angle outside wiring portion receives supply of a current from outside. The field angle outside wiring portion may include a part extending generally in parallel to an edge of the field angle region at a position separated from the field angle region only at a predetermined distance, and placed outside the field angle region on a side of the second ends in the longitudinal direction, of the two adjacent parallel arrangement portions, and an additional projecting portion placed between the extension lines of the two adjacent parallel arrangement portions such that the additional projecting portion projects from the part toward the field angle region.

With such a configuration, it is possible to prevent or restrain the temperature of the region near the end parts of the two adjacent parallel arrangement portions, the end parts being not connected via the connecting portion, from being lower than the temperature of the region near the end parts connected via the connecting portion.

In one aspect of the present disclosure, the heating wire may further include a field angle outside wiring portion provided outside the field angle region and connected to an electrode such that the field angle outside wiring portion receives supply of a current from outside. The field angle outside wiring portion may include: a part extending generally in parallel to an edge of the field angle region at a position separated from the field angle region only at a predetermined distance; and a bending portion having a first end connected to the part, the bending portion being configured to be bent at an acute angle at a position between the extension lines of the two adjacent parallel arrangement portions such that a second end of the bending portion is connected to a part extending to be separated from the field angle region.

The provision of the bending portion can enhance an effect of preventing or restraining the temperature of the region near the end parts not connected via the connecting portion from being lower than the temperature of the region near the end parts connected via the connecting portion.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
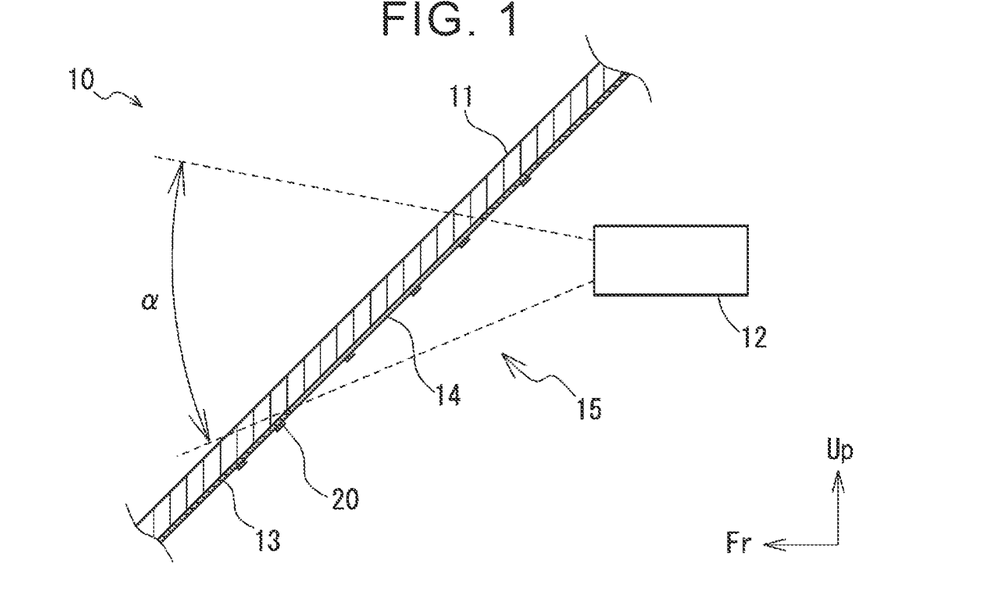
FIG. 1 is a sectional view illustrating a positional relationship between a front windshield and a camera.

A vehicle 10 partially illustrated in FIG. 1 includes a front windshield 11 and a camera 12. The front windshield 11 is a transparent glass plate. The front windshield 11 is provided on a side toward which the camera 12 captures an image (a side from which visible light incident on the camera 12 comes). The camera 12 is configured to capture an image of a landscape ahead of the vehicle 10 across the front windshield 11 (that is, acquire information outside the vehicle 10) by detecting visible light passing through the front windshield 11. Note that, in FIG. 1, the front side in the front rear-direction of the vehicle 10 is indicated by an arrow Fr, and the upper side in the up-down direction of the vehicle 10 is indicated by an arrow Up.

The front windshield 11 is provided with a mask 13 having a light blocking effect. The mask 13 has an opening 14. A field angle region α that is an image capture region for the camera 12 is defined by the opening 14 of the mask 13. That is, the opening 14 of the mask 13 in the viewpoint of the camera 12 corresponds to the field angle region α of the camera 12. Note that, in FIG. 1, α indicates a field angle region in the up-down direction. However, in practice, the field angle region α is a two-dimensional region expanding in the up-down direction and in the right-left direction. The opening 14 may be a physical through-hole or may be a light transmissive part (a transparent part) instead of a physical through-hole. As illustrated in FIG. 1, the front windshield 11 is inclined downward toward the front side. Accordingly, the opening 14 provided in the mask 13 has a generally trapezoidal shape in which the lower side is wider in width than the upper side (see FIG. 2 and so on) so that the image captured by the camera 12 has a generally rectangular shape.

A defogging device 15 according to each embodiment of the present disclosure is applied to the front windshield 11. The defogging device 15 according to each embodiment of the present disclosure heats at least the opening 14 of the mask 13 in the front windshield 11 (that is, a region in the front windshield 11, the region corresponding to the inner side of the field angle region α of the camera 12, and hereinafter just referred to as "inside the field angle region α"). Hereby, the defogging device 15 according to each embodiment prevents fogging inside the field angle region α and also removes fogging when the field angle region α fogs.

As illustrated in FIGS. 2 to 8, the defogging device 15 according to each embodiment includes a heating wire 20 disposed on the surfaces of the front windshield 11 and the mask 13. The heating wire 20 is made of a material configured to generate heat by current application. A metal wire such as a copper wire, a silver wire, or a stainless wire, for example, is applicable to the heating wire 20. Respective electrodes 201 are connected to the opposite ends of the heating wire 20. The electrodes 201 are electrically connected to a power supply and a control device (not illustrated) provided in the vehicle 10. A current supplied from the power supply flows through the heating wire 20 of the defogging device 15 according to each embodiment via the control device. The control device is configured to be operable by a user of the vehicle 10, and the user of the vehicle 10 can selectively switch "ON" in which a current flows through the heating wire 20 and "OFF" in which no current flows through the heating wire 20. When the heating wire 20 generates heat by the current thus supplied from the power supply, the field angle region α of the front windshield 11 is heated to increase in temperature.

First Embodiment

Figure 2:
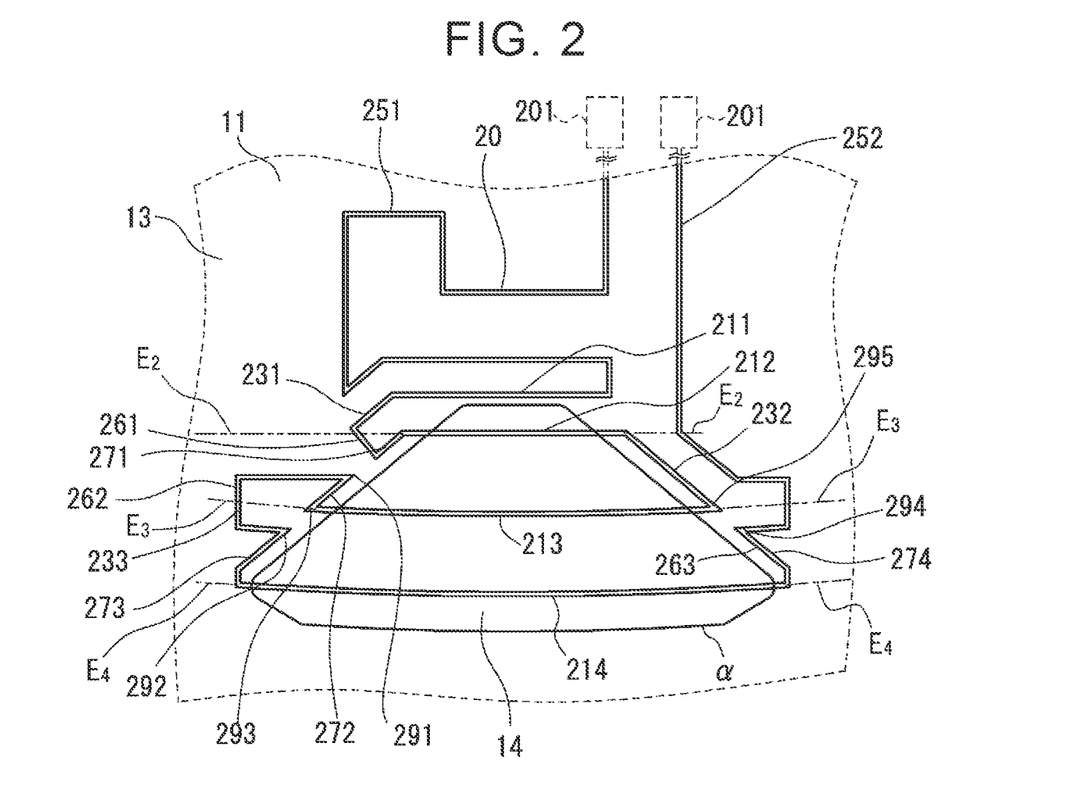
FIG. 2 is a view illustrating a configuration of a heating wire of a defogging device according to a first embodiment.

As illustrated in FIG. 2, the heating wire 20 includes four parallel arrangement portions (a first parallel arrangement portion 211, a second parallel arrangement portion 212, a third parallel arrangement portion 213, and a fourth parallel arrangement portion 214), three connecting portions (a first connecting portion 231, a second connecting portion 232, and a third connecting portion 233), and two electrode connecting portions (a first electrode connecting portion 251 and a second electrode connecting portion 252). These parallel arrangement portions are parts disposed at predetermined distances generally in parallel to each other and extending in the horizontal direction of the vehicle 10. Note that the parallel arrangement portions may have a linear shape or may be curved in an arcuate shape. Each of the connecting portions is a part via which two adjacent parallel arrangement portions are connected to each other. Each of the electrode connecting portions is a part via which the electrode 201 is connected to a predetermined parallel arrangement portion.

As illustrated in FIG. 2, the four parallel arrangement portions are disposed in order of the first parallel arrangement portion 211, the second parallel arrangement portion 212, the third parallel arrangement portion 213, and the fourth parallel arrangement portion 214 sequentially from the top. The four parallel arrangement portions are all generally parallel to an upper edge and a lower edge of the trapezoidal field angle region α. The first parallel arrangement portion 211 is placed outside the opening 14 of the mask 13 in the front windshield 11 (hereinafter just referred to as "outside the field angle region α"). The first parallel arrangement portion 211 includes a part extending along the upper edge of the field angle region α (in other words, a part separated from the upper edge of the field angle region α at a predetermined distance and disposed generally in parallel to the upper edge). Respective intermediate parts, in the longitudinal direction, of the second parallel arrangement portion 212, the third parallel arrangement portion 213, and the fourth parallel arrangement portion 214 are placed inside the field angle region α. The opposite end parts, in the longitudinal direction, of each of the second parallel arrangement portion 212, the third parallel arrangement portion 213, and the fourth parallel arrangement portion 214 are placed outside the field angle region α.

Further, an end part, of the first parallel arrangement portion 211, on an opposite side to a side where the first parallel arrangement portion 211 is connected to the first connecting portion 231, is connected to the first electrode connecting portion 251. Accordingly, the first parallel arrangement portion 211 is connected to the electrode 201 via the first electrode connecting portion 251. An end part, of the fourth parallel arrangement portion 214, on an opposite side to a side where the fourth parallel arrangement portion 214 is connected to the third connecting portion 233 is connected to the second electrode connecting portion 252. Accordingly, the fourth parallel arrangement portion 214 is connected to the electrode 201 via the second electrode connecting portion 252. Note that the first electrode connecting portion 251 and the second electrode connecting portion 252 are field angle outside wiring portions provided outside the field angle region α.

Respective end parts (end parts on the left side in FIG. 2), in the longitudinal direction, of the first parallel arrangement portion 211 and the second parallel arrangement portion 212 adjacent to each other are connected to each other via the first connecting portion 231. Respective end parts (end parts on the right side in FIG. 2), in the longitudinal direction, of the second parallel arrangement portion 212 and the third parallel arrangement portion 213 adjacent to each other are connected to each other via the second connecting portion 232. Respective end parts (end parts on the left side in FIG. 2), in the longitudinal direction, of the third parallel arrangement portion 213 and the fourth parallel arrangement portion 214 adjacent to each other are connected to each other via the third connecting portion 233. The first connecting portion 231, the second connecting portion 232, and the third connecting portion 233 are all placed outside the field angle region α. When two adjacent parallel arrangement portions among the four parallel arrangement portions are focused as such, respective first end parts, in the longitudinal direction, of the two parallel arrangement portions are connected to each other via a connecting portion outside the field angle region α. In the meantime, respective second end parts of the two parallel arrangement portions, the respective second end parts being on an opposite side to the respective first end parts, are separated from each other. Each of the respective second end parts of the two parallel arrangement portions is connected to another part of the heating wire 20, more specifically, a connecting portion to be connected to a parallel arrangement portion different from the two parallel arrangement portions thus focused, the first electrode connecting portion 251, or the second electrode connecting portion 252. In other words, the four parallel arrangement portions include a parallel arrangement portion configured such that "a first end, in the longitudinal direction, of the parallel arrangement portion is connected to 'another parallel arrangement portion' adjacently disposed on a first side of the parallel arrangement portion via a connecting portion, and a second end, in the longitudinal direction, of the parallel arrangement portion is connected to 'further another parallel arrangement portion (a parallel arrangement portion different from the aforementioned 'another parallel arrangement portion')' adjacently disposed on a second side of the parallel arrangement portion via another connecting portion (a connecting portion different from the aforementioned connecting portion)." As such, the heating wire 20 includes a part extending in a zigzag manner such that the parallel arrangement portions and the connecting portions are serially connected alternatingly. Note that, in the following description, a region disposed between two adjacent parallel arrangement portions and disposed near their respective end parts connected to each other via a connecting portion is referred to as a "connected-end side region," and a region disposed between the two adjacent parallel arrangement portions and disposed near their respective end parts separated from each other (in other words, their respective end parts being not connected to each other) is referred to as a "non-connected-end side region."

The second connecting portion 232 is placed between the second parallel arrangement portion 212 and the third parallel arrangement portion 213 and between an extension line $E_2$ of the second parallel arrangement portion 212 and an extension line $E_3$ of the third parallel arrangement portion 213. The second connecting portion 232 extends along a predetermined edge of the field angle region α (a given diagonal edge of the trapezoidal shape in the present embodiment). That is, the second connecting portion 232 is placed close to the predetermined edge of the field angle region α and is generally parallel to the predetermined edge.

The first connecting portion 231 and the third connecting portion 233 include respective heat-amount supplement portions 261, 262. The heat-amount supplement portion 261 of the first connecting portion 231 is a projecting portion projecting toward the third parallel arrangement portion 213 side from the second parallel arrangement portion 212 and the extension line $E_2$. The heat-amount supplement portion 262 of the third connecting portion 233 is a projecting portion projecting toward the second parallel arrangement portion 212 side from the third parallel arrangement portion 213 and the extension line $E_3$ That is, the projecting portions projecting toward respective adjacent counterpart parallel arrangement portions are connected to the end parts (the end parts separated from each other) of the second parallel arrangement portion 212 and the third parallel arrangement portion 213 adjacent to each other, the end parts being not connected to each other via the second connecting portion 232. The heat-amount supplement portions 261, 262 include respective adjoining portions 271, 272 each extending along a predetermined edge of the field angle region α. The adjoining portions 271, 272 are placed close to the predetermined edge (a given diagonal edge of the trapezoidal shape in the present embodiment) of the field angle region α (in other words, the adjoining portions 271, 272 are separated from the predetermined edge at predetermined distances) and are generally parallel to the predetermined edge. Note that the distances from the predetermined edge of the field angle region α to the adjoining portions 271, 272 are not limited but, in some examples, are as small as possible.

In such a configuration, a connected-end side region (a region on the right side in the longitudinal direction in FIG. 2) between the second parallel arrangement portion 212 and the third parallel arrangement portion 213 is heated mainly by heat generated from the second parallel arrangement portion 212, the third parallel arrangement portion 213, and the second connecting portion 232. Note that the second connecting portion 232 is placed outside the field angle region α but is placed at a position near a predetermined edge of the field angle region α along the predetermined edge. With such a configuration, the amount of heat to be transmitted into the field angle region α from the second connecting portion 232 can be increased, thereby making it possible to enhance an effect of defogging the connected-end side region between the second parallel arrangement portion 212 and the third parallel arrangement portion 213.

A non-connected-end side region (a region on the left side in the longitudinal direction in FIG. 2) between the second parallel arrangement portion 212 and the third parallel arrangement portion 213 is heated mainly by heat generated from the second parallel arrangement portion 212, the third parallel arrangement portion 213, the heat-amount supplement portion 261 of the first connecting portion 231, and the heat-amount supplement portion 262 of the third connecting portion 233. With such a configuration, it is possible to prevent or restrain the temperature of the non-connected-end side region between the second parallel arrangement portion 212 and the third parallel arrangement portion 213 from becoming low in comparison with the temperature of the connected-end side region. In other words, it is possible to achieve a uniform temperature distribution in the region between the second parallel arrangement portion 212 and the third parallel arrangement portion 213. Accordingly, it is possible to enhance an effect of defogging the non-connected-end side region between the second parallel arrangement portion 212 and the third parallel arrangement portion 213 (in other words, it is possible to prevent or restrain the effect of defogging the non-connected-end side region from decreasing in comparison with the effect of defogging the connected-end side region).

That is, in a configuration where the heat-amount supplement portions 261, 262 are not provided in the first connecting portion 231 and the third connecting portion 233, the amount of heat to be transmitted to the non-connected-end side region between the second parallel arrangement portion 212 and the third parallel arrangement portion 213 is small in comparison with the connected-end side region where the second connecting portion 232 is provided. Accordingly, in this case, the temperature of the non-connected-end side region between the second parallel arrangement portion 212 and the third parallel arrangement portion 213 is low in comparison with the temperature of the connected-end side region. As a result, it may be difficult to obtain an effect of sufficiently defogging the non-connected-end side region between the second parallel arrangement portion 212 and the third parallel arrangement portion 213.

In the present embodiment, the first connecting portion 231 and the third connecting portion 233 include the heat-amount supplement portions 261, 262. The heat-amount supplement portions 261, 262 further include the adjoining portions 271, 272. Similarly to the second connecting portion 232, the adjoining portions 271, 272 are placed between the second parallel arrangement portion 212 and the third parallel arrangement portion 213 and between the extension line $E_2$ and the extension line $E_3$ and are provided along a predetermined edge of the field angle region α (generally in parallel with the predetermined edge of the field angle region α). Accordingly, similarly to the second connecting portion 232, the adjoining portions 271, 272 can supply heat to the region between the second parallel arrangement portion 212 and the third parallel arrangement portion 213.

In such a configuration, it is not necessary to decrease an interval between parallel arrangement portions in order to prevent or restrain an uniform temperature distribution in the front windshield 11. Accordingly, it is not necessary to dispose many heating wires 20 inside the field angle region α, and therefore, the quality of the image captured by the camera 12 is not largely affected. That is, the number of heating wires 20 appearing on the image captured by the camera 12 is not large, so that the quality of the image captured by the camera 12 does not decrease. Further, it is not necessary to decrease an interval between the heating wires 20 (particularly, an interval between parallel arrangement portions), so that the possibility of short circuit between the heating wires 20 is not high.

The heat-amount supplement portion 262 of the third connecting portion 233 includes a part 291 (hereinafter an "acute bending portion") at which the heating wire 20 bends at an acute angle. More specifically, the heat-amount supplement portion 262 includes a part connected to one end (an end part close to the second parallel arrangement portion 212) of the adjoining portion 272 that is generally parallel to a predetermined edge of the field angle region α and extending to be separated from the field angle region α (e.g., a part generally parallel to the second parallel arrangement portion 212 and the third parallel arrangement portion 213). The acute bending portion 291 is provided in a connecting portion between the "one end of the adjoining portion 272" and the "part extending to be separated from the field angle region α" The amount of heat to be supplied to the front windshield 11 from the acute bending portion 291 of the heat-amount supplement portion 262 and its vicinity is large in comparison with the amount of heat to be supplied to the front windshield 11 from other parts of the heat-amount supplement portion 262. The acute bending portion 291 is placed between the second parallel arrangement portion 212 and the third parallel arrangement portion 213 and between the extension line $E_2$ and the extension line $E_3$. Accordingly, in comparison with a configuration where the acute bending portion 291 is not provided in the heat-amount supplement portion 262, it is possible to increase the amount of heat to be supplied to the non-connected-end side region between the second parallel arrangement portion 212 and the third parallel arrangement portion 213 from the heat-amount supplement portion 262. Accordingly, it is possible to enhance an effect of preventing or restraining the temperature of the non-connected-end side region between the second parallel arrangement portion 212 and the third parallel arrangement portion 213 from becoming low in comparison with the temperature of the connected-end side region therebetween.

More specifically, the adjoining portion 271 of the heat-amount supplement portion 261 of the first connecting portion 231 is not directly connected to the adjoining portion 272 of the heat-amount supplement portion 262 of the third connecting portion 233. Further, in order to prevent short circuit between the adjoining portion 271 of the heat-amount supplement portion 261 of the first connecting portion 231 and the adjoining portion 272 of the heat-amount supplement portion 262 of the third connecting portion 233, the adjoining portions 271, 272 are separated from each other at some distance. Accordingly, a part where the heating wire 20 breaks off is present in one end part, in the longitudinal direction, of the region between the second parallel arrangement portion 212 and the third parallel arrangement portion 213 and between the extension line $E_2$ and the extension line $E_3$. Accordingly, in a configuration where the acute bending portion 291 is not provided in the heat-amount supplement portion 262, the amount of heat to be supplied to the non-connected-end side region from the heat-amount supplement portions 261, 262 might become smaller than the amount of heat to be supplied to the connected-end side region from the second connecting portion 232. In the present embodiment, since the acute bending portion 291 is provided in the heat-amount supplement portion 262, it is possible to increase the amount of heat to be supplied to the non-connected-end side region in comparison with the configuration where the acute bending portion 291 is not provided. Accordingly, it is possible to enhance the effect of preventing or restraining the temperature of the non-connected-end side region between the second parallel arrangement portion 212 and the third parallel arrangement portion 213 from becoming low in comparison with the temperature of the connected-end side region therebetween.

Note that a region between the acute bending portion 291 of the heat-amount supplement portion 262 of the third connecting portion 233 and the heat-amount supplement portion 261 of the first connecting portion 231 is a "part where the adjoining portions 271, 272 are not provided." In other words, the acute bending portion 291 of the heat-amount supplement portion 262 of the third connecting portion 233 is provided in a part facing the "part where the adjoining portions 271, 272 are not provided." With such a configuration, it is possible to prevent or restrain the temperature near the "part where the adjoining portions 271, 272 are not provided" from being lower than the temperature in other parts.

An additional adjoining portion 273 and an additional acute bending portion 292 provided in the third connecting portion 233 are placed between the third parallel arrangement portion 213 and the fourth parallel arrangement portion 214 and between the extension line $E_3$ of the third parallel arrangement portion 213 and an extension line $E_4$ of the fourth parallel arrangement portion 214. A connected-end side region between the third parallel arrangement portion 213 and the fourth parallel arrangement portion 214 is heated mainly by heat generated from the third parallel arrangement portion 213, the fourth parallel arrangement portion 214, and the additional adjoining portion 273 and the additional acute bending portion 292 of the third connecting portion 233.

In the configuration where the heat-amount supplement portion 262 is provided in the third connecting portion 233, the heating wire 20 forming the third connecting portion 233 is partially drawn toward the second parallel arrangement portion 212 side from the third parallel arrangement portion 213 and the extension line $E_3$. Accordingly, a part where the heating wire 20 is locally separated from a predetermined edge of the field angle region α (that is, a part where the additional adjoining portion 273 of the third connecting portion 233 is not provided) is present between the third parallel arrangement portion 213 and the fourth parallel arrangement portion 214 and between the extension line $E_3$ and the extension line $E_4$. Accordingly, in a configuration where the additional acute bending portion 292 is not provided in the third connecting portion 233, the amount of heat to be supplied to the connected-end side region between the third parallel arrangement portion 213 and the fourth parallel arrangement portion 214 from the third connecting portion 233 might become small in comparison with a "configuration where the second connecting portion 232 (the heating wire 20) is present along a predetermined edge of the field angle region α without breaking off" like the connected-end side region between the second parallel arrangement portion 212 and the third parallel arrangement portion 213.

In the present embodiment, it is possible to supplement, by the additional acute bending portion 292, insufficiency in the amount of heat due to the presence of the "part where the additional adjoining portion 273 is not provided." Particularly, the additional acute bending portion 292 is provided at a position facing the "part where the additional adjoining portion 273 is not provided." In other words, a region between the additional acute bending portion 292 and the third connecting portion 233 is the "part where the additional adjoining portion 273 is not provided." With such a configuration, it is possible to prevent or restrain the temperature near the "part where the additional adjoining portion 273 is not provided" from being lower than the temperature in other parts.

Further, an acute bending portion 293 is also provided in an end part (an end part on the left side in FIG. 2) of the third parallel arrangement portion 213, the end part being connected to the third connecting portion 233. The additional acute bending portion 292 faces the acute bending portion 293. In other words, a region between the additional acute bending portion 292 of the third connecting portion 233 and the acute bending portion 293 is the "part where the additional adjoining portion 273 is not provided." With such a configuration, it is possible to enhance an effect of preventing or restraining the temperature near the "part where the additional adjoining portion 273 is not provided" from being lower than the temperature in other parts.

The second electrode connecting portion 252 is placed in respective end parts, of the third parallel arrangement portion 213 and the fourth parallel arrangement portion 214, on the opposite side to the side where the third parallel arrangement portion 213 and the fourth parallel arrangement portion 214 are connected to each other via the third connecting portion 233. The second electrode connecting portion 252 includes a part extending in a direction intersecting with the longitudinal direction of the third parallel arrangement portion 213 and the fourth parallel arrangement portion 214. This part and its vicinity are provided with a heat-amount supplement portion 263. An adjoining portion 274 and an acute bending portion 294 are provided in the heat-amount supplement portion 263. The adjoining portion 274 is a part close to a predetermined edge of the field angle region α (in other words, separated from the field angle region α at a predetermined distance) and generally parallel to the predetermined edge. The acute bending portion 294 is placed in an end part (an end part close to the third parallel arrangement portion 213) of the adjoining portion 274. More specifically, the heat-amount supplement portion 263 includes a part having a first end connected to the end part of the adjoining portion 274 and a second end extending to be separated from the field angle region α (e.g., a part extending generally in parallel to the third parallel arrangement portion 213 and the fourth parallel arrangement portion 214). The acute bending portion 294 is provided in a connecting portion between the "end part of the adjoining portion 274" and the "part extending to be separated from the field angle region α." Accordingly, a non-connected-end side region between the third parallel arrangement portion 213 and the fourth parallel arrangement portion 214 is heated mainly by heat generated from the third parallel arrangement portion 213, the fourth parallel arrangement portion 214, and the heat-amount supplement portion 263 provided in the second electrode connecting portion 252. Accordingly, it is possible to prevent or restrain the temperature of the non-connected-end side region between the third parallel arrangement portion 213 and the fourth parallel arrangement portion 214 from becoming low in comparison with the temperature of the connected-end side region therebetween.

Note that no heating wire 20 is provided in a region between the acute bending portion 294 of the heat-amount supplement portion 263 of the second electrode connecting portion 252 and the third parallel arrangement portion 213, but the acute bending portion 294 is provided very close to the region. Accordingly, it is possible to prevent or restrain the temperature in the region and its vicinal region from becoming lower than the temperature in other parts. Further, an acute bending portion 295 is also provided in the end part, of the third parallel arrangement portion 213, on the opposite side to the side where the third parallel arrangement portion 213 is connected to the third connecting portion 233. Note that the acute bending portion 295 and the acute bending portion 294 of the heat-amount supplement portion 263 of the second electrode connecting portion 252 are provided so as to face each other at a predetermined distance. Accordingly, it is possible to enhance an effect of preventing or restraining, also by heat generated from the acute bending portion 295 of the third parallel arrangement portion 213, the temperature of the non-connected-end side region between the third parallel arrangement portion 213 and the fourth parallel arrangement portion 214 from being lower than the temperature of the connected-end side region therebetween.

Note that the above description deals with a configuration in which the acute bending portion 291 is provided in the heat-amount supplement portion 262 of the third connecting portion 233, and no acute bending portion is provided in the heat-amount supplement portion 261 of the first connecting portion 231. However, the defogging device 15 according to the present embodiment is not limited to such a configuration. For example, the defogging device 15 may be configured such that the acute bending portion 291 is not provided in the heat-amount supplement portion 262 of the third connecting portion 233, and an acute bending portion is provided in the heat-amount supplement portion 261 of the first connecting portion 231. Further, the above description deals with a configuration in which the first connecting portion 231 and the third connecting portion 233 both include the heat-amount supplement portions 261, 262. However, the defogging device 15 according to the present embodiment is not limited to such a configuration. In order to supply heat to the non-connected-end side region between the second parallel arrangement portion 212 and the third parallel arrangement portion 213, at least either one of the first connecting portion 231 and the third connecting portion 233 should include a heat-amount supplement portion.

Further, the above description deals with a configuration in which the second electrode connecting portion 252 includes the heat-amount supplement portion 263 in order to supply heat to the non-connected-end side region between the third parallel arrangement portion 213 and the fourth parallel arrangement portion 214. However, the defogging device 15 according to the present embodiment is not limited to such a configuration. For example, instead of the heat-amount supplement portion 263 provided in the second electrode connecting portion 252, a heat-amount supplement portion configured to supply heat to the non-connected-end side region between the third parallel arrangement portion 213 and the fourth parallel arrangement portion 214 may be provided in the second connecting portion 232. Furthermore, the second electrode connecting portion 252 and the second connecting portion 232 may be both provided with heat-amount supplement portions configured to supply heat to the non-connected-end side region between the third parallel arrangement portion 213 and the fourth parallel arrangement portion 214.

The important thing is that a heat-amount supplement portion configured to supply heat to a non-connected-end side region between two adjacent parallel arrangement portions should be connected to respective end parts of the two adjacent parallel arrangement portions, the end parts being not connected to each other. The heat-amount supplement portion should be placed between the two parallel arrangement portions and between their extension lines and should include a part close to a predetermined edge of the field angle region α (a part provided along the predetermined edge of the field angle region α). Further, the heat-amount supplement portion may include an acute bending portion.

Second Embodiment

Figure 3:
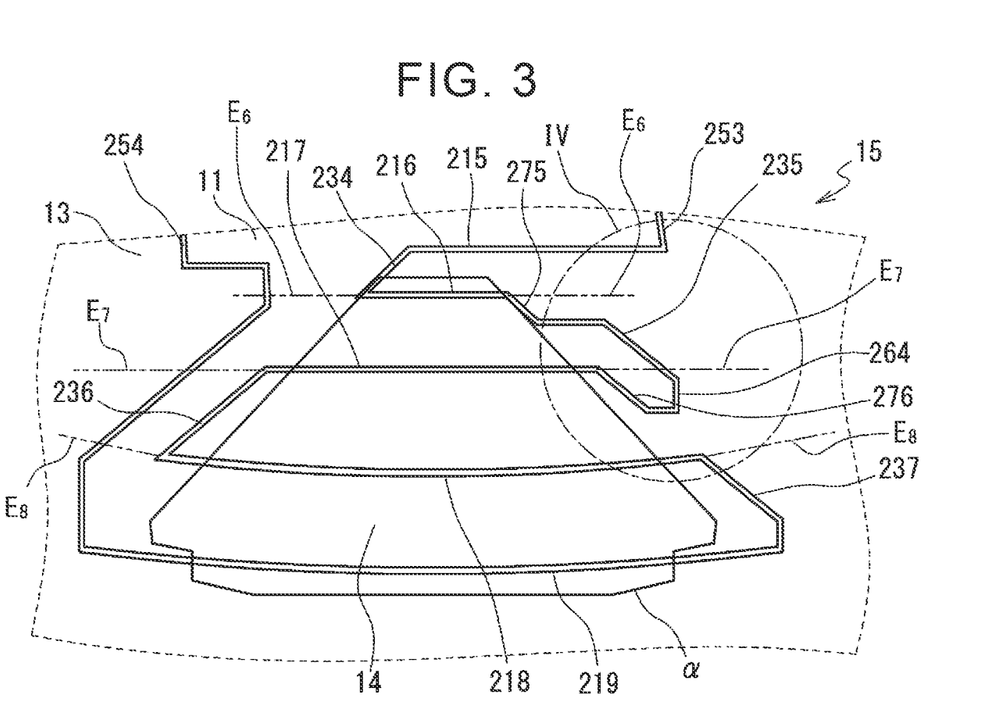
FIG. 3 is a view illustrating a configuration of a heating wire of a defogging device according to a second embodiment.

As illustrated in FIG. 3, the heating wire 20 of the defogging device 15 according to a second embodiment includes a fifth parallel arrangement portion 215, a sixth parallel arrangement portion 216, a seventh parallel arrangement portion 217, an eighth parallel arrangement portion 218, and a ninth parallel arrangement portion 219 sequentially in this order from the top. The fifth to ninth parallel arrangement portions 215 to 219 are generally parallel to each other and also generally parallel to the upper edge and the lower edge of the field angle region α. The fifth to ninth parallel arrangement portions 215 to 219 may have a linear shape or may be curved in an arcuate shape. The fifth parallel arrangement portion 215 is provided outside the field angle region α. Respective intermediate parts, in the longitudinal direction, of the sixth parallel arrangement portion 216, the seventh parallel arrangement portion 217, the eighth parallel arrangement portion 218, and the ninth parallel arrangement portion 219 are placed inside the field angle region α, and the opposite end parts of each of the sixth parallel arrangement portion 216, the seventh parallel arrangement portion 217, the eighth parallel arrangement portion 218, and the ninth parallel arrangement portion 219 are placed outside the field angle region α.

Respective end parts (end parts on the left side in FIG. 3), in the longitudinal direction, of the fifth parallel arrangement portion 215 and the sixth parallel arrangement portion 216 adjacent to each other are connected to each other via a fourth connecting portion 234. Respective end parts (end parts on the right side in FIG. 3), in the longitudinal direction, of the sixth parallel arrangement portion 216 and the seventh parallel arrangement portion 217 adjacent to each other are connected to each other via a fifth connecting portion 235. Respective end parts (end parts on the left side in FIG. 3), in the longitudinal direction, of the seventh parallel arrangement portion 217 and the eighth parallel arrangement portion 218 adjacent to each other are connected to each other via a sixth connecting portion 236. Respective end parts (end parts on the right side in FIG. 3), in the longitudinal direction, of the eighth parallel arrangement portion 218 and the ninth parallel arrangement portion 219 adjacent to each other are connected to each other via a seventh connecting portion 237. The fifth parallel arrangement portion 215 is connected to the electrode 201 (not illustrated in FIG. 3) via a third electrode connecting portion 253. The ninth parallel arrangement portion 219 is connected to the electrode 201 via a fourth electrode connecting portion 254.

The fifth connecting portion 235 is provided with an adjoining portion 275 placed between the sixth parallel arrangement portion 216 and the seventh parallel arrangement portion 217 and between an extension line $E_6$ of the sixth parallel arrangement portion 216 and an extension line $E_7$ of the seventh parallel arrangement portion 217. The adjoining portion 275 is a part close to a predetermined edge of the field angle region α and generally parallel to the predetermined edge. Accordingly, a connected-end side region between the sixth parallel arrangement portion 216 and the seventh parallel arrangement portion 217 is heated mainly by heat generated from the sixth parallel arrangement portion 216, the seventh parallel arrangement portion 217, and the adjoining portion 275 of the fifth connecting portion 235.

The fifth connecting portion 235 is further provided with a heat-amount supplement portion 264. The heat-amount supplement portion 264 includes a projecting portion projecting toward the eighth parallel arrangement portion 218 from the seventh parallel arrangement portion 217 (in other words, a part placed between the seventh parallel arrangement portion 217 and the eighth parallel arrangement portion 218 and between the extension line $E_7$ and the extension line $E_8$). The end part of the seventh parallel arrangement portion 217 (the end part, of the seventh parallel arrangement portion 217, on the opposite side to the side where the seventh parallel arrangement portion 217 is connected to the eighth parallel arrangement portion 218 via the sixth connecting portion 236) is connected to the heat-amount supplement portion 264. The heat-amount supplement portion 264 includes an additional adjoining portion 276. The additional adjoining portion 276 is placed between the seventh parallel arrangement portion 217 and the eighth parallel arrangement portion 218 and between the extension line $E_7$ and the extension line $E_8$ and includes a part extending along a predetermined edge of the field angle region α. Accordingly, a non-connected-end side region between the seventh parallel arrangement portion 217 and the eighth parallel arrangement portion 218 is heated mainly by heat generated from the seventh parallel arrangement portion 217, the eighth parallel arrangement portion 218, and the heat-amount supplement portion 264 (particularly, the additional adjoining portion 276 provided in the heat-amount supplement portion 264) of the fifth connecting portion 235.

The sixth connecting portion 236 is placed between the seventh parallel arrangement portion 217 and the eighth parallel arrangement portion 218 and between the extension line $E_7$ and the extension line $E_8$. Further, the sixth connecting portion 236 is close to a predetermined edge (a diagonal edge of the trapezoidal shape) of the field angle region α and generally parallel to the predetermined edge. Accordingly, a connected-end side region between the seventh parallel arrangement portion 217 and the eighth parallel arrangement portion 218 is heated mainly by heat generated from the seventh parallel arrangement portion 217, the eighth parallel arrangement portion 218, and the sixth connecting portion 236. With such a configuration, it is possible to prevent or restrain a temperature difference from being caused between the non-connected-end side region and the connected-end side region between the seventh parallel arrangement portion 217 and the eighth parallel arrangement portion 218.

Figure 4:
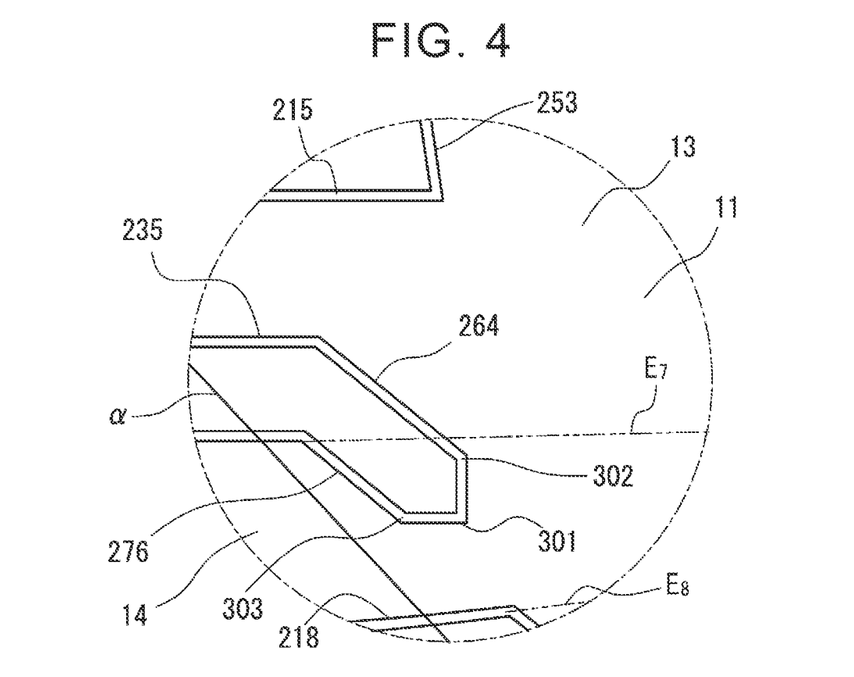
FIG. 4 is an enlarged view of a part IV in FIG. 3.

FIG. 4 is an enlarged view of a part IV in FIG. 3. As illustrated in FIG. 4, the heat-amount supplement portion 264 includes a bending portion 301 bending at a generally right angle, and two bending portions 302, 303 bending at an angle of generally 135° and provided on the opposite sides of the bending portion 301 bending at a generally right angle. The heat-amount supplement portion 264 is turned around by generally 180° as a whole by the three bending portions 301, 302, 303. As such, an acute bending portion may not be provided in the heat-amount supplement portion 264, provided that a desired temperature distribution is achievable.

Note that FIG. 3 illustrates a configuration in which a heat-amount supplement portion configured to supply heat to a non-connected-end side region between the sixth parallel arrangement portion 216 and the seventh parallel arrangement portion 217 is not provided. However, the defogging device 15 according to the present embodiment is not limited to such a configuration. For example, in order to supply heat to the non-connected-end side region between the sixth parallel arrangement portion 216 and the seventh parallel arrangement portion 217, at least either one of the fourth connecting portion 234 and the sixth connecting portion 236 may include a heat-amount supplement portion. In this case, the same configuration as the heat-amount supplement portion 261 of the first connecting portion 231 in the first embodiment can be applied to a heat-amount supplement portion to be provided in the fourth connecting portion 234. The same configuration as the heat-amount supplement portion 262 of the third connecting portion 233 in the first embodiment can be applied to a heat-amount supplement portion to be provided in the sixth connecting portion 236.

Further, FIG. 3 illustrates a configuration in which the heat-amount supplement portion configured to supply heat to a non-connected-end side region between the eighth parallel arrangement portion 218 and the ninth parallel arrangement portion 219 is not provided. However, the defogging device 15 according to the present embodiment is not limited to such a configuration. For example, in order to supply heat to the non-connected-end side region between the eighth parallel arrangement portion 218 and the ninth parallel arrangement portion 219, at least either one of the sixth connecting portion 236 and the fourth electrode connecting portion 254 may include a heat-amount supplement portion. In this case, the same configuration as the heat-amount supplement portion 262 of the third connecting portion 233 in the first embodiment can be applied to a heat-amount supplement portion to be provided in the sixth connecting portion 236. The same configuration as the heat-amount supplement portion 263 provided in the second electrode connecting portion 252 in the first embodiment can be applied to a heat-amount supplement portion to be provided in the fourth electrode connecting portion 254.

Third Embodiment

Figure 5:
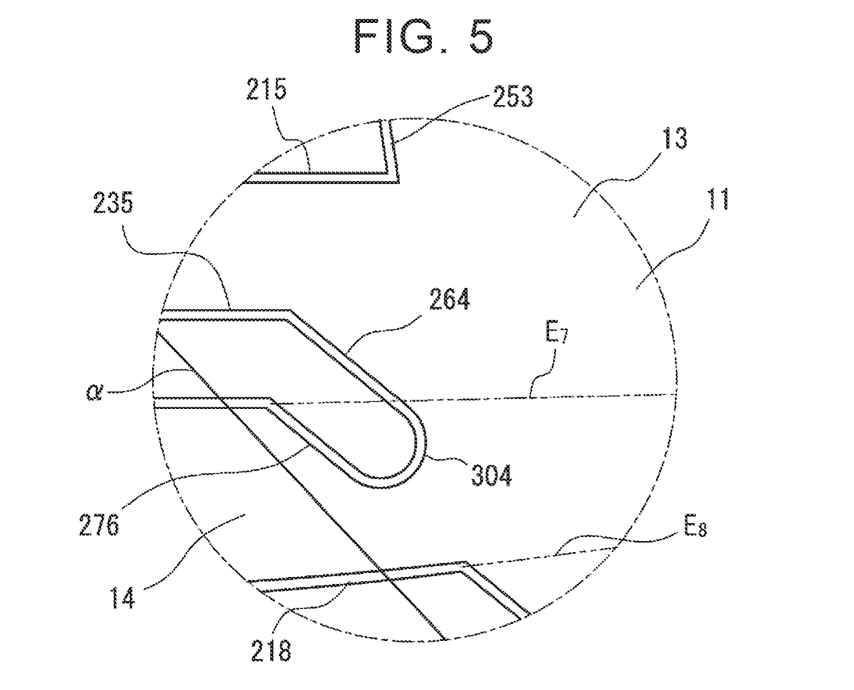
FIG. 5 is a view illustrating a configuration of a heating wire of a defogging device according to a third embodiment.

The third embodiment is a modification of the second embodiment. On this account, the same reference sign used in the second embodiment is assigned to a common part to the second embodiment, and descriptions thereof are omitted. FIG. 5 is an enlarged view of the heat-amount supplement portion 264 of the fifth connecting portion 235 of the present embodiment and is a view corresponding to FIG. 4. As illustrated in FIG. 5, the heat-amount supplement portion 264 of the fifth connecting portion 235 does not include a bending portion and includes a curved portion 304 curved in a semicircular shape in a distal end, in the projection direction, of the heat-amount supplement portion. Even with such a configuration, it is possible to obtain the same effect as in the second embodiment.

Fourth Embodiment

Figure 6:
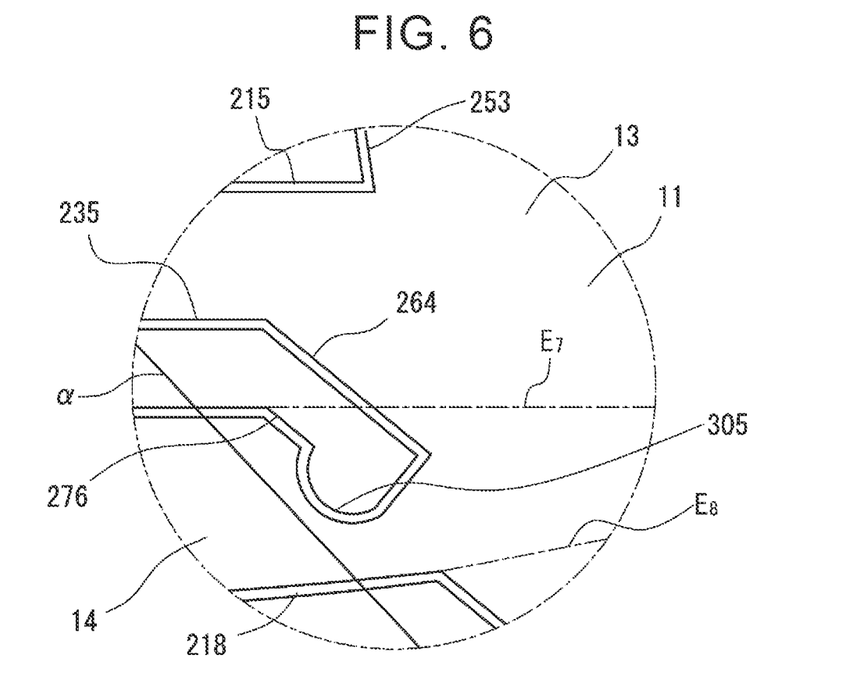
FIG. 6 is a view illustrating a configuration of a heating wire of a defogging device according to a fourth embodiment.

The fourth embodiment is a modification of the second embodiment. On this account, the same reference sign used in the second embodiment is assigned to a common part to the second embodiment, and descriptions thereof are omitted. FIG. 6 is an enlarged view of the heat-amount supplement portion 264 of the fifth connecting portion 235 of the present embodiment and is a view corresponding to FIG. 4. As illustrated in FIG. 6, the heat-amount supplement portion 264 of the fifth connecting portion 235 includes a part 305 projecting toward the field angle region α side. That is, the heat-amount supplement portion 264 has a generally "P" shape as a whole. The part 305 projecting toward the field angle region α side is closer to a predetermined edge of the field angle region α than the adjoining portion 276. On this account, in comparison with the second embodiment and the third embodiment, the amount of heat to be supplied into the field angle region α from the heat-amount supplement portion 264 can be increased. Note that the part 305 projecting toward the field angle region α side has a generally semicircular shape, but the shape of the part 305 is not limited to the semicircular shape. Further, the part 305 may include an acute bending portion.

Fifth Embodiment

Figure 7:
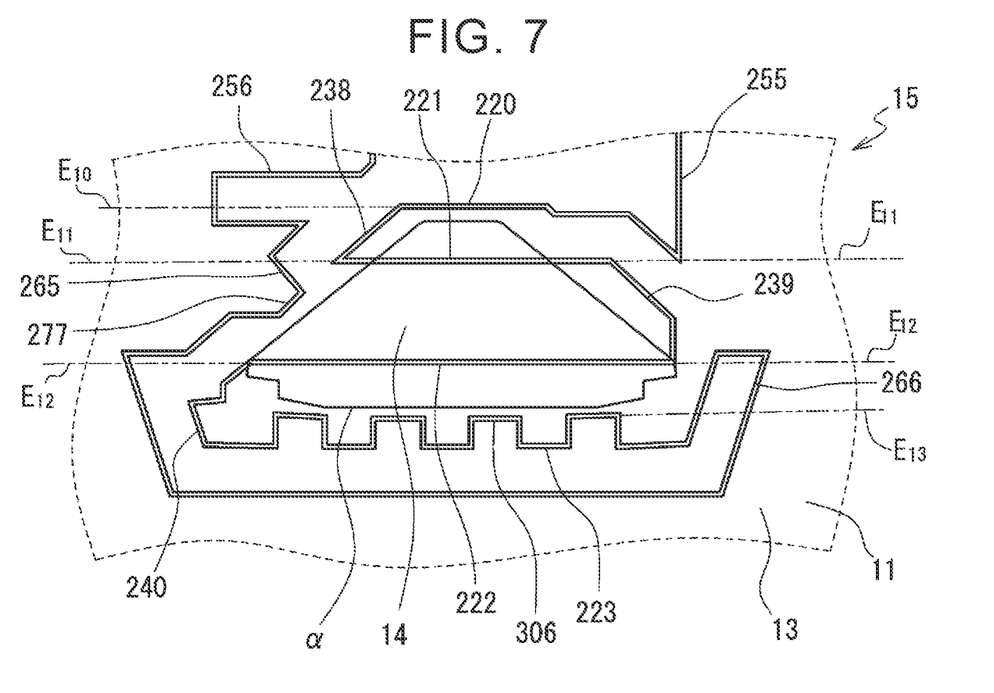
FIG. 7 is a view illustrating a configuration of a heating wire of a defogging device according to a fifth embodiment.

As illustrated in FIG. 7, the heating wire 20 of the defogging device 15 according to a fifth embodiment includes a plurality of parallel arrangement portions, a plurality of connecting portions, and a plurality of electrode connecting portions. The parallel arrangement portions include a 10th parallel arrangement portion 220, an 11th parallel arrangement portion 221, a 12th parallel arrangement portion 222, and a 13th parallel arrangement portion 223 sequentially in this order from the top. The 10th parallel arrangement portion 220 and the 13th parallel arrangement portion 223 are placed outside the field angle region α. Respective intermediate parts, in the longitudinal direction, of the 11th parallel arrangement portion 221 and the 12th parallel arrangement portion 222 are placed inside the field angle region α. The opposite end parts, in the longitudinal direction, of each of the 11th parallel arrangement portion 221 and the 12th parallel arrangement portion 222 are placed outside the field angle region α. The connecting portions include an 8th connecting portion 238, a 9th connecting portion 239, and a 10th connecting portion 240. The 8th connecting portion 238, the 9th connecting portion 239, and the 10th connecting portion 240 are placed outside the field angle region α. The electrode connecting portions include a fifth electrode connecting portion 255 and a sixth electrode connecting portion 256. The fifth electrode connecting portion 255 and the sixth electrode connecting portion 256 are field angle outside wiring portions placed outside the field angle region α.

Respective first end parts (end parts on the left side in FIG. 7), in the longitudinal direction, of the 10th parallel arrangement portion 220 and the 11th parallel arrangement portion 221 adjacent to each other are connected to each other via the 8th connecting portion 238. Respective second end parts (end parts on the right side in FIG. 7), in the longitudinal direction, of the 10th parallel arrangement portion 220 and the 11th parallel arrangement portion 221 are separated from each other without being connected to each other. Respective first end parts (end parts on the right side in FIG. 7), in the longitudinal direction, of the 11th parallel arrangement portion 221 and the 12th parallel arrangement portion 222 adjacent to each other are connected to each other via the 9th connecting portion 239. Respective second end parts (end parts on the left side in FIG. 7), in the longitudinal direction, of the 11th parallel arrangement portion 221 and the 12th parallel arrangement portion 222 are separated from each other without being connected to each other. Respective first end parts (end parts on the left side in FIG. 7), in the longitudinal direction, of the 12th parallel arrangement portion 222 and the 13th parallel arrangement portion 223 adjacent to each other are connected to each other via the 10th connecting portion 240. Respective second end parts (end parts on the right side in FIG. 7), in the longitudinal direction, of the 12th parallel arrangement portion 222 and the 13th parallel arrangement portion 223 are separated from each other without being connected to each other. The 10th parallel arrangement portion 220 is connected to the electrode 201 (not illustrated in FIG. 7) via the 5th electrode connecting portion 255. The 13th parallel arrangement portion 223 is connected to the electrode 201 via the 6th electrode connecting portion 256.

The 8th connecting portion 238 is placed between the 10th parallel arrangement portion 220 and the 11th parallel arrangement portion 221 and between an extension line $E_{10}$ of the 10th parallel arrangement portion 220 and an extension line $E_{11}$ of the 11th parallel arrangement portion 221. Further, the eighth connecting portion 238 is close to a predetermined edge (a diagonal edge of the trapezoidal shape) of the field angle region α and includes a part generally parallel to the predetermined edge. Accordingly, a connected-end side region between the 10th parallel arrangement portion 220 and the 11th parallel arrangement portion 221 is heated mainly by heat generated from the 10th parallel arrangement portion 220, the 11th parallel arrangement portion 221, and the 8th connecting portion 238. The 9th connecting portion 239 is placed between the 11th parallel arrangement portion 221 and the 12th parallel arrangement portion 222 and between the extension line $E_{11}$ of the 11th parallel arrangement portion 221 and an extension line $E_{12}$ of the 12th parallel arrangement portion 222. Further, the ninth connecting portion 239 is close to a predetermined edge of the field angle region α and includes a part generally parallel to the predetermined edge. Accordingly, a connected-end side region between the 11th parallel arrangement portion 221 and the 12th parallel arrangement portion 222 is heated mainly by heat generated from the 11th parallel arrangement portion 221, the 12th parallel arrangement portion 222, and the 9th connecting portion 239. The 10th connecting portion 240 includes a part close to the field angle region α. Accordingly, a connected-end side region between the 12th parallel arrangement portion 222 and the 13th parallel arrangement portion 223 is heated mainly by heat generated from the 12th parallel arrangement portion 222, the 13th parallel arrangement portion 223, and the 10th connecting portion 240.

The sixth electrode connecting portion 256 includes a part placed outside a predetermined edge of the field angle region α (a given diagonal edge of the trapezoidal shape and a diagonal edge on the left side in FIG. 7) and extending in a direction intersecting with the longitudinal direction of the 11th parallel arrangement portion 221 and the 12th parallel arrangement portion 222 along the predetermined edge. This part is, more specifically, a part separated from the predetermined edge of the field angle region α at a predetermined distance and generally parallel to the predetermined edge of the field angle region α. This part of the 6th electrode connecting portion 256 is provided with a heat-amount supplement portion 265 configured to supply heat to a non-connected-end side region between the 11th parallel arrangement portion 221 and the 12th parallel arrangement portion 222. The heat-amount supplement portion 265 is a projecting portion placed between the extension line $E_{11}$ of the 11th parallel arrangement portion 221 and the extension line $E_{12}$ of the 12th parallel arrangement portion 222 and projecting from the above part toward the field angle region α side (projecting so as to be closer to the predetermined edge of the field angle region α). An adjoining portion 277 is provided in the heat-amount supplement portion 265. The adjoining portion 277 is a part placed between the extension line $E_{11}$ of the 11th parallel arrangement portion 221 and the extension line $E_{12}$ of the 12th parallel arrangement portion 222 and generally parallel to the predetermined edge of the field angle region α.

With such a configuration, it is possible to prevent or restrain the temperature of the non-connected-end side region between the 11th parallel arrangement portion 221 and the 12th parallel arrangement portion 222 from being lower than the temperature of the connected-end side region therebetween. That is, with a configuration in which the heat-amount supplement portion 265 is provided in the 6th electrode connecting portion 256, it is possible to increase the amount of heat to be supplied to the non-connected-end side region between the 11th parallel arrangement portion 221 and the 12th parallel arrangement portion 222 in comparison with a configuration where the heat-amount supplement portion 265 is not provided. Accordingly, it is possible to prevent or restrain the temperature of the non-connected-end side region between the 11th parallel arrangement portion 221 and the 12th parallel arrangement portion 222 from being lower than the temperature of the connected-end side region therebetween.

Further, the 6th electrode connecting portion 256 is provided with a heat-amount supplement portion 266 configured to supply heat to a non-connected-end side region between the 12th parallel arrangement portion 222 and the 13th parallel arrangement portion 223. The heat-amount supplement portion 266 is a part placed near the end parts of the 12th parallel arrangement portion 222 and the 13th parallel arrangement portion 223, the end parts being not connected to each other, such that the part projects toward the 12th parallel arrangement portion 222 side from the extension line $E_{13}$ of the 13th parallel arrangement portion 223. The heat-amount supplement portion 266 can supply heat to the non-connected-end side region between the 12th parallel arrangement portion 222 and the 13th parallel arrangement portion 223. Accordingly, it is possible to prevent or restrain the temperature of the non-connected-end side region between the 12th parallel arrangement portion 222 and the 13th parallel arrangement portion 223 from being lower than the temperature of the connected-end side region therebetween.

The 13th parallel arrangement portion 223 includes a plurality of projecting portions 306 locally projecting toward the field angle region α side. When the 13th parallel arrangement portion 223 includes such projecting portions 306, it is possible to adjust the amount of heat to be supplied into the field angle region α from the 13th parallel arrangement portion 223.

Sixth Embodiment

Figure 8:
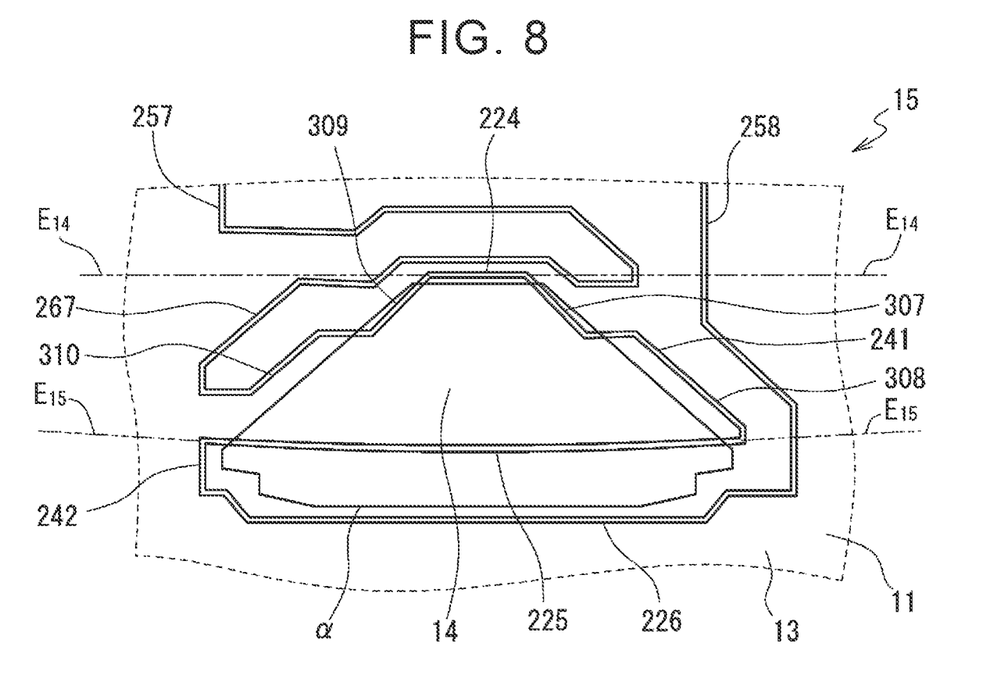
FIG. 8 is a view illustrating a configuration of a heating wire of a defogging device according to a sixth embodiment.

As illustrated in FIG. 8, the heating wire 20 of the defogging device 15 according to a sixth embodiment includes a plurality of parallel arrangement portions, a plurality of connecting portions, and a plurality of electrode connecting portions. The parallel arrangement portions include a 14th parallel arrangement portion 224, a 15th parallel arrangement portion 225, and a 16th parallel arrangement portion 226 sequentially in this order from the top. The 14th parallel arrangement portion 224, the 15th parallel arrangement portion 225, and the 16th parallel arrangement portion 226 are generally parallel to each other and also generally parallel to the upper edge and the lower edge of the field angle region α. An intermediate part, in the longitudinal direction, of the 15th parallel arrangement portion 225 is placed inside the field angle region α, and the opposite end parts of the 15th parallel arrangement portion 225 are placed outside the field angle region α. The 14th parallel arrangement portion 224 and the 16th parallel arrangement portion 226 are placed outside the field angle region α. Note that the 14th parallel arrangement portion 224, the 15th parallel arrangement portion 225, and the 16th parallel arrangement portion 226 may have a linear shape or may be curved in an arcuate shape.

The connecting portions include an 11th connecting portion 241 and a 12th connecting portion 242. Respective end parts (end parts on the right side in FIG. 8), in the longitudinal direction, of the 14th parallel arrangement portion 224 and the 15th parallel arrangement portion 225 adjacent to each other are connected to each other via the 11th connecting portion 241. Respective end parts (end parts on the left side in FIG. 8), in the longitudinal direction, of the 15th parallel arrangement portion 225 and the 16th parallel arrangement portion 226 adjacent to each other are connected to each other via the 12th connecting portion 242. The electrode connecting portions include a seventh electrode connecting portion 257 and an eighth electrode connecting portion 258. The 14th parallel arrangement portion 224 is connected to the electrode 201 via the 7th electrode connecting portion 257. The 16th parallel arrangement portion 226 is connected to the electrode 201 via the 8th electrode connecting portion 258.

The 11th connecting portion 241 includes an overlapping portion 307 that is a part placed inside the field angle region α and an adjoining portion 308 that is a part placed outside the field angle region α. The overlapping portion 307 and the adjoining portion 308 are provided closely along a predetermined edge of the field angle region α. That is, the overlapping portion 307 and the adjoining portion 308 are close to the predetermined edge and generally parallel to the predetermined edge. Accordingly, a connected-end side region between the 14th parallel arrangement portion 224 and the 15th parallel arrangement portion 225 is heated mainly by heat generated from the 14th parallel arrangement portion 224, the 15th parallel arrangement portion 225, and the 11th connecting portion 241.

The 12th connecting portion 242 is placed outside the field angle region α and is close to a predetermined corner part (a left lower corner part in FIG. 8) of the field angle region α. Accordingly, a connected-end side region between the 15th parallel arrangement portion 225 and the 16th parallel arrangement portion 226 is heated mainly by heat generated from the 15th parallel arrangement portion 225, the 16th parallel arrangement portion 226, and the 12th connecting portion 242.

The seventh electrode connecting portion 257 includes a part placed above the 14th parallel arrangement portion 224 (in other words, on a side of the 14th parallel arrangement portion 224, the side where the field angle region α is not provided) and generally parallel to the 14th parallel arrangement portion 224. The seventh electrode connecting portion 257 includes a heat-amount supplement portion 267. The heat-amount supplement portion 267 is a projecting portion projecting toward the 15th parallel arrangement portion 225 across the 14th parallel arrangement portion 224 from an end part of the part generally parallel to the 14th parallel arrangement portion 224 (more specifically, an end part placed on the same side as respective end parts of the 14th parallel arrangement portion 224 and the 15th parallel arrangement portion 225, the respective end parts being not connected to each other). The heat-amount supplement portion 267 includes an overlapping portion 309 that is a part placed inside the field angle region α and an adjoining portion 310 that is a part placed outside the field angle region α. The overlapping portion 309 and the adjoining portion 310 have generally the same configurations as the overlapping portion 307 and the adjoining portion 308 of the 11th connecting portion 241. Accordingly, a non-connected-end side region between the 14th parallel arrangement portion 224 and the 15th parallel arrangement portion 225 is heated mainly by heat generated from the 14th parallel arrangement portion 224, the 15th parallel arrangement portion 225, and the heat-amount supplement portion 267 of the 7th electrode connecting portion 257. Accordingly, it is possible to prevent or restrain the temperature of the non-connected-end side region between the 14th parallel arrangement portion 224 and the 15th parallel arrangement portion 225 from being lower than the temperature of the connected-end side region therebetween.

Note that the 14th parallel arrangement portion 224 and the 16th parallel arrangement portion 226 are provided outside the field angle region α and close to the field angle region α. With such a configuration, it is possible to increase the amount of heat to be supplied into the field angle region α from the 14th parallel arrangement portion 224 and the 16th parallel arrangement portion 226. Accordingly, with such a configuration, it is possible to secure a desired defogging effect and to reduce the number of parallel arrangement portions to be provided in the field angle region α.

Note that the present embodiment deals with a configuration in which the 11th connecting portion 241 includes the overlapping portion 307, and the heat-amount supplement portion 267 of the 7th electrode connecting portion 257 includes the overlapping portion 309, but the present disclosure is not limited to such a configuration. For example, the 11th connecting portion 241 may include only the adjoining portion 308 and may not include the overlapping portion 307. Similarly, the heat-amount supplement portion 267 of the seventh electrode connecting portion 257 may include only the adjoining portion 310 and may not include the overlapping portion 309.

The embodiments of the present disclosure have been described as above, but the technical scope of the present disclosure is not limited to the above embodiments. Various modifications can be made within a range that does not deviate from the gist of the present disclosure.

For example, the number of parallel arrangement portions is not limited to the numbers described in the above embodiments. Further, each of the above embodiments deals with a configuration in which the defogging device 15 is applied to the front windshield 11 of the vehicle 10. However, an application target to which the defogging device 15 is applied is not limited to the front windshield 11. The defogging device 15 may be applied to a rear windshield of the vehicle 10. Further, the defogging device 15 may be applied to a member other than window glass of the vehicle 10. For example, the defogging device 15 may be applied to a sensor cover for protecting a sensor.

Each of the embodiments deals with a configuration in which the field angle region α of the camera 12 is defined by the opening 14 of the mask 13 provided in the front windshield 11. However, the present disclosure is not limited to such a configuration. For example, the field angle region α of the camera 12 may be a region smaller than the opening 14 of the mask 13. Further, the front windshield 11 may not be provided with the mask 13.

Each of the above embodiments deals with an example in which each parallel arrangement portion is generally horizontal. However, the present disclosure is not limited to such a configuration. Each parallel arrangement portion may extend generally in the up-down direction or may extend in a direction inclined from the horizontal direction and the up-down direction (e.g., a direction inclined from the horizontal direction at an angle of 45°). Further, each parallel arrangement portion may be linear or may be curved.

Each of the above embodiments deals with a configuration in which the heating wire 20 is directly disposed on a surface of the front windshield 11, the surface facing the inner side of the vehicle. However, the present disclosure is not limited to such a configuration. For example, a transparent plate-shaped member may be provided on the surface of the front windshield 11, the surface facing the inner side of the vehicle, and the heating wire 20 may be disposed on the transparent plate-shaped member. The important thing is that the heating wire 20 should be disposed on the surface of the front windshield 11, the surface facing the inner side of the vehicle, regardless of whether the heating wire 20 is disposed thereon directly or indirectly.

The camera 12 is provided as a sensor, but the sensor is not limited to the camera 12. The sensor may be a light detection and ranging or laser imaging detection and ranging (LIDAR) system. The important thing is that the sensor should be configured to acquire information outside the vehicle 10 by detecting an electromagnetic wave (note that the electromagnetic wave includes visible light) incident on the sensor from outside the vehicle 10.

What is claimed is:

1. A defogging device for defogging a windshield having a light blocking mask and a trapezoidal opening within the light blocking mask, the defogging device comprising a heating wire disposed on the windshield, the heating wire being configured to heat the windshield by generating heat by current application and comprising:
    a first portion parallel to an upper portion of the trapezoidal opening, and positioned above the trapezoidal opening; and
    a plurality of second parallel portions parallel to the first portion and positioned below the upper portion of the trapezoidal opening and above a lower portion of the trapezoidal opening;
    wherein outer ends of the plurality of second parallel portions extend outside of the trapezoidal opening; and
    a projecting portion coupled to an outer end of at least one portion of the plurality of second parallel portions, wherein a first portion of the projecting portion extends above or below a line extending from the at least one portion of the plurality of second parallel portions in a longitudinal direction, a second portion of the projecting portion is perpendicular to the first portion of the projecting portion, and a third portion of the projecting portion is parallel to the first portion of the projecting portion.

2. The defogging device according to claim 1, wherein the projecting portion includes a bending portion bending at an acute angle.

3. The defogging device according to claim 1, wherein:
a first end of the heating wire is connected to a first electrode and a second end of the heating wire is connected to a second electrode such that the heating wire receives supply of a current from outside.

\* \* \* \* \*